United States Patent
Tinker et al.

(10) Patent No.: US 6,274,261 B1
(45) Date of Patent: Aug. 14, 2001

(54) CYLINDRICAL METAL-AIR BATTERY WITH A CYLINDRICAL PERIPHERAL AIR CATHODE

(75) Inventors: Lawrence A. Tinker, Woodstock; R. Dennis Bentz, Marietta, both of GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/215,820

(22) Filed: Dec. 18, 1998

(51) Int. Cl.⁷ ........................................ H01M 4/00
(52) U.S. Cl. .................. 429/27; 429/34; 429/38; 429/13
(58) Field of Search ................... 429/27, 34, 38, 429/39, 72, 28, 22

(56) References Cited

U.S. PATENT DOCUMENTS

| | | |
|---|---|---|
| 272,058 | 2/1883 | Kauffer et al. . |
| 1,510,617 | 10/1924 | Varé . |
| 1,956,243 | 4/1934 | McEachron et al. . |
| 2,605,299 | 7/1952 | Teas . |
| 2,938,064 | 5/1960 | Kordesch . |
| 3,124,487 | 3/1964 | Duddy et al. . |
| 3,160,528 | 12/1964 | Dengler et al. . |
| 3,473,963 | 10/1969 | Sanderson . |
| 3,632,449 | 1/1972 | Yardney . |
| 3,697,326 | 10/1972 | Jammet . |
| 3,871,920 | 3/1975 | Greiber et al. . |
| 3,881,959 | 5/1975 | Tsuchida et al. . |
| 3,963,519 | 6/1976 | Louie . |
| 3,975,210 | 8/1976 | Warnock . |
| 4,009,320 | 2/1977 | Gerbier . |
| 4,054,725 | 10/1977 | Tuburaya . |
| 4,112,198 | 9/1978 | Przybyla et al. . |
| 4,211,830 | 7/1980 | Chevet . |
| 4,214,044 | 7/1980 | Chevet et al. . |
| 4,279,970 | 7/1981 | Breault et al. . |
| 4,303,743 | 12/1981 | Réau . |
| 4,376,809 | 3/1983 | Bindin . |
| 4,450,211 | 5/1984 | Vignaud . |
| 4,521,497 | 6/1985 | Tamminen . |
| 4,626,482 | 12/1986 | Hamlen et al. . |
| 4,640,874 | 2/1987 | Kelm . |
| 4,822,698 | 4/1989 | Jackovitz et al. . |
| 4,913,983 | 4/1990 | Cheiky . |
| 4,938,742 | 7/1990 | Smits . |
| 4,943,750 | 7/1990 | Howe et al. . |

(List continued on next page.)

FOREIGN PATENT DOCUMENTS

| | | |
|---|---|---|
| 2 148 276 | 3/1973 | (FR) . |
| 1 459 135 | 12/1976 | (GB) . |
| 10-148181 | 2/1998 | (JP) . |
| 10-148181 | 6/1998 | (JP) . |

OTHER PUBLICATIONS

"Overview of Microelectromechanical Systems, Microactuation Methods (those more commonly in use)," Mehran Mehregany, Case Western Reserve University, Cleveland, Ohio, Copyright 1992.

Primary Examiner—Carol Chaney
Assistant Examiner—Raymond Alejandro
(74) Attorney, Agent, or Firm—Alston & Bird LLP (57) ABSTRACT

A cylindrical metal-air cell has a cylindrical housing, an axially extending cylindrical air cathode adjacent an interior surface of the housing, and a plurality of elongate plenums defined between the oxygen electrode and the interior surface of the housing. Isolating passageway are positioned between the ambient environment and each of the plenums, and an air moving device is operable to force air through the isolating passageways and into at least one of the plenums. The air moving device may be a micromachined blower controlled by a circuit integrated into the housing of the blower.

13 Claims, 5 Drawing Sheets

U.S. PATENT DOCUMENTS

| | | |
|---|---|---|
| 5,066,204 | 11/1991 | Point et al. . |
| 5,143,804 | 9/1992 | McArthur et al. . |
| 5,183,222 | 2/1993 | Ramsey, Jr. . |
| 5,258,239 | 11/1993 | Kobayashi . |
| 5,328,778 | 7/1994 | Woodruff et al. . |
| 5,354,625 | 10/1994 | Bentz et al. . |
| 5,356,729 | 10/1994 | Pedicini . |
| 5,387,477 | 2/1995 | Cheiky . |
| 5,398,011 | 3/1995 | Kimura et al. . |
| 5,466,932 | 11/1995 | Young et al. . |
| 5,560,999 | 10/1996 | Pedicini et al. . |
| 5,599,174 | 2/1997 | Cook . |
| 5,639,568 | 6/1997 | Pedicini et al. . |
| 5,691,074 | 11/1997 | Pedicini . |
| 5,758,823 | 6/1998 | Glezer et al. . |
| 5,778,513 | 7/1998 | Miu et al. . |

CYLINDRICAL METAL-AIR BATTERY WITH A CYLINDRICAL PERIPHERAL AIR CATHODE

RELATED APPLICATIONS

The following patent applications for related subject matter,
"AIR MANAGER SYSTEMS FOR METAL-AIR BATTERIES UTILIZING A DIAPHRAGM OR BELLOWS" (Attorney Docket 01446-0890);
"AIR MOVER FOR A METAL-AIR BATTERY UTILIZING A VARIABLE VOLUME ENCLOSURE" (Attorney Docket 01446-1110);
"DIFFUSION CONTROLLED AIR VENT WITH AN INTERIOR FAN" (Attorney Docket 01446-0940);
"UNIFORM SHELL FOR A METAL-AIR BATTERY" (Attorney Docket 01446-1100);
"LOAD RESPONSIVE AIR DOOR FOR A METAL-AIR CELL" (Attorney Docket 01446-1130);
"Geometry Change Diffusion Tube For Metal-Air Batteries" (Attorney Docket 01446-1000);
"AIR-MANAGING SYSTEM FOR METAL-AIR BATTERY USING RESEALABLE SEPTUM" (Attorney Docket 01446-1070); and
"AIR DELIVERY SYSTEM WITH VOLUME-CHANGEABLE PLENUM OF METAL-AIR BATTERY" (Attorney Docket 01446-0910);
all of which are incorporated herein by reference, have been filed concurrently with the present application.

TECHNICAL FIELD

The present invention relates to metal-air batteries of the type that are supplied with reactive gas by an active air moving device, and more particularly relates to a cylindrical metal-air cell having a cylindrical peripheral air cathode.

BACKGROUND OF THE INVENTION

Generally described, a metal-air cell, such as a zinc-air cell, uses one or more air permeable cathodes separated from a metallic zinc anode by an aqueous electrolyte. During operation of the cell, oxygen from the ambient air is converted at the one or more cathodes to produce hydroxide ions. The metallic zinc anode is then oxidized by the hydroxide ions. Water and electrons are released in this electrochemical reaction to provide electrical power.

Initially, metal-air cells found limited commercial use in devices, such as hearing aids, which required a low level of power. In these cells, the air openings which admitted air to the air cathode were so small that the cells could operate for some time without flooding or drying out as a result of the typical difference between the outside relative humidity and the water vapor pressure within the cell. However, the power output of such cells was too low to operate devices such as camcorders, cellular phones, or laptop computers. Furthermore, enlarging the air openings of a typical "button cell" was not practical because it would lead to premature failure as a result of flooding or drying out In order to increase the power output of metal-air cells so that they could be used to operate devices such as camcorders, cellular phones, or laptop computers, air managers were developed with a view to providing a flow of reactive air to the air cathodes of one or more metal-air cells while isolating the cells from environmental air and humidity when no output is required. As compared to conventional electrochemical power sources, metal-air cells containing air managers provide relatively high power output and long lifetime with relatively low weight. These advantages are due in part to the fact that metal-air cells utilize oxygen from the ambient air as the reactant in the electrochemical process as opposed to a heavier material such as a metal or a metallic composition. Examples of air managers are shown in U.S. Pat. Nos. 4,913,983, 5,356,729, and 5,691,074.

Attempts have been made to design a metal-air cell to fit the form of a standard "D" or "AA" cylindrical alkaline cell. Cylindrical batteries without air managers are shown in U.S. Pat. No. 3,697,326 and European Published Application No. 1,459,135. The lack of success of these designs likely is attributable to an inability to provide high enough power output for devices typically operated by conventional standard sized cylindrical cells without providing large air openings that allow the cells to flood or dry out.

Thus, there is a need in the art for a standard size cylindrical metal-air cell that can provide a power output level sufficient to operate electrical devices, whether individually or in groups inserted into a battery compartment of such devices. Such a cell also should not flood or dry out when inserted into such devices and left unattended during extended periods of non-use.

SUMMARY OF THE INVENTION

The present invention seeks to provide a cylindrical metal-air cell that can provide a high power output level, and also can be inserted into electrical devices and left unattended during extended periods of non-use without flooding or drying out.

This object is achieved according to the present invention by a cylindrical metal-air cell having a generally cylindrical housing, a generally cylindrical oxygen electrode extending axially adjacent an interior surface of the housing, a plurality of elongate plenums defined between the oxygen electrode and the interior surface of the housing, an isolating passageway positioned between the ambient environment and each of the plenums, and an air moving device operable when on for forcing air through the isolating passageways and into at least one of the plenums. The isolating passageways are operable while unsealed and the air moving device is not forcing air through the isolating passageway to protect the cell from the ambient environment.

In one embodiment of the present invention, the axial plenums are formed by the shape of the electrode material, preferably a conductive, carbon-containing material. In this embodiment, the housing or case may be smoothly cylindrical. In another embodiment, the housing forms multiple axial plenums and the outer surface of the electrode material may be smoothly cylindrical. In either embodiment, the housing may be conductive, and the carbon material of the electrode may contact the housing to provide current collection for the electrode.

Preferably, the isolating passageways are formed in end pieces that seal the ends of the housing. The air moving device may be any appropriate apparatus for moving air, such as a miniature fan, a micromachine fan, or a diaphragm air pump. In an alternative embodiment of the invention, the isolating passageways may be provided only at one end of the housing and an air pathway may be defined so that air may be moved from that end along one set of the axial plenums in one direction along the cell, and returned along another set of the axial plenums in the opposite direction. Also, air may be forced into and out of a plenum through the same isolating passageway.

Cells embodying the present invention can be used individually, combined in a battery pack, or placed in groups in conventional battery compartments of electrical devices where the cells are connected in series or in parallel. Each cell having a standard "D" size can produce a power output of at least about 1.25 watt using a micromachine blower that draws 10% or less of the cell's available power while moving air at a rate of 75 cc per minute or higher. Each cell having a standard "AA" size can produce a power output of at least 0.5 watt using a micromachine fan that draws 10% or less of the cell's available power while moving air at a rate of 30 cc per minute or higher. It is possible to construct cells embodying the present invention having a standard "D" size that produce a power output of 2.5 watt or more using a micromachine blower that draws 10% or less of the cell's available power while moving air at a rate of 150 cc per minute or higher, and cells having a standard "AA" size that produce a power output of 1.0 watt or more using a micromachine fan that draws 10% or less of the cell's available power while moving air at a rate of 60 cc per minute or higher.

Other objects, features and advantages of the present invention will become apparent upon reviewing the following detailed description of preferred embodiments of the invention, when taken in conjunction with the drawings and the appended claims.

DETAILED DESCRIPTION

Figures 1, 2, 3:
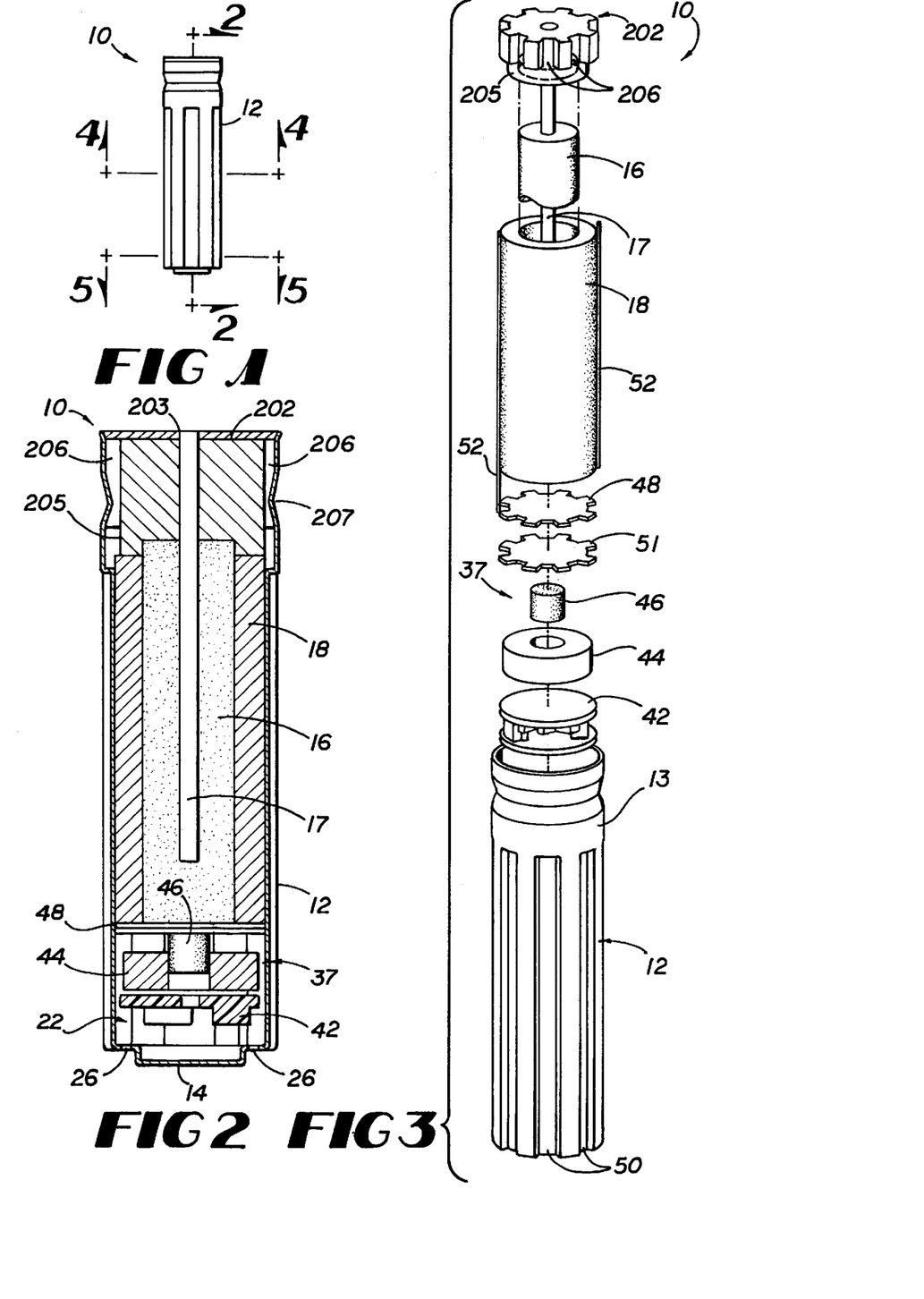
FIG. 1 is a side plan view of a cylindrical metal-air cell embodying the present invention.
FIG. 2 is a side cross sectional view taken along line 2—2 of FIG. 1.
FIG. 3 is an exploded pictorial view of the components of the cell of FIGS. 1 and 2.

Referring now in more detail to the drawings, in which like numerals represent like parts throughout the several views, FIG. 1 shows a cylindrical metal-air cell 10 embodying the present invention. The cell 10 can be made in any desired size into which its components can be fit, such as a standard "D" or "AA" size.

As shown in FIGS. 1–5, the cell 10 is built within a case or housing 12, which may be deep drawn from a conductive metal to form a can similar to those developed for other types of cells, such as alkaline cells. During the formation of the generally cylindrical housing 12, a plurality of spaced apart, axially extending indentations 50 are formed in the cylindrical wall 13 of the housing. The indentations 50 begin at a location spaced down from the top of the cell 10 and extend preferably the entire remaining length of the cylindrical wall. A protrusion 14 is formed in the bottom of the cell to act as a cathode terminal.

A hollow, cylindrical air cathode 18 is installed intermediate the length of the cell 10 with the top of the cathode approximately aligned just above the beginning of the indentations 50. The cathode may be made of a drilled out carbon-containing rod, or an extruded cylinder. The composition of the cathode preferably is a conductive carbon material such as carbon black, activated carbon, or graphitic type carbon, treated with a catalyst material to promote oxygen reduction, with a binder material such as Teflon or polyamide type polymer or other suitable polymer binder to provide mechanical strength. The exterior of the cathode could be coated with a hydrophobic material such as microporous Teflon to prevent liquid transfer but allow oxygen access to the carbon catalyst mixture. A suitable cathode composition is described in pending U.S. patent application Ser. No. 09/177,852, entitled "Primary Metal-Air Power Source and Ventilation System for the Same," filed Oct. 23, 1998, and incorporated herein by reference.

Figure 4:
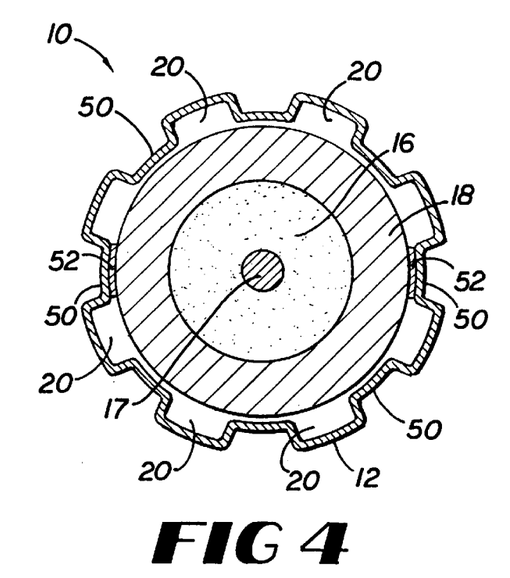
FIG. 4 is a radial cross sectional view taken along line 4—4 of FIG. 1.

A separator (a wettable microporous polypropylene sheet, not shown) lines the interior of the hollow cathode, which is filled with an anode material that preferably is a zinc powder gelled with an electrolyte solution, such as potassium hydroxide, in a known manner. A pair of non-conductive plates (not shown) hold the anode material within the center of the cathode. As shown in FIG. 4, the cathode 18 fits within the housing 12 in a manner so that a plurality of cathode plenums 20 are formed by the areas between the indentations 50 of the housing 12. The plenums 20 extend axially along the length of the cathode 18, and are spaced around its outer cylindrical surface.

Preferably, the conductive housing at the indentations 50 is in electrical contact with the cathode material, so that the housing itself may provide cathode current collection. In addition, copper foil strips 52 may be placed between the housing 12 and the cathode 18 at two indentations located on opposite sides of the housing. The strips 52 can be connected to the cathode terminal 14 to assist in current collection, and they also divide the plenums 20 into two groups, which can define separate flow paths for air in a manner described below. If desired, the housing material at the indentations can be spaced away from the cathode material, leaving the copper foil strips 52 as the only cathode current collectors and allowing air to pass between the plenums within each group, but preferably not between the two groups. This alternative configuration increases the cathode surface exposed to the air for higher power output.

At the top of the cell 10, a sealing cap 202 is held in place closing off the open end of the cell 10 in a conventional manner using an annular crimped area 204 in the housing 12. The cap defines a central projection 205, that is somewhat smaller in diameter than the case 12. The projection 205 extends down to hold the cathode 18 and anode material 16 in place. An anode current collector spike 17 passes through the cap 202 at an opening 203 and extends axially down along the center of the anode material in a known manner. The upper end of the spike 17 provides an anode terminal The cap 202 defines a plurality of axially extending, peripheral isolating passageways 206 that remain unsealed when the cap 202 is otherwise sealed within the top of the cell. It should be understood that the passageways 206 optionally could be openings fully surrounded by cap material, or could connect the interior of the cell to the exterior environment along a different path, for example, to openings in the side wall of the housing 12.

Figure 5A:
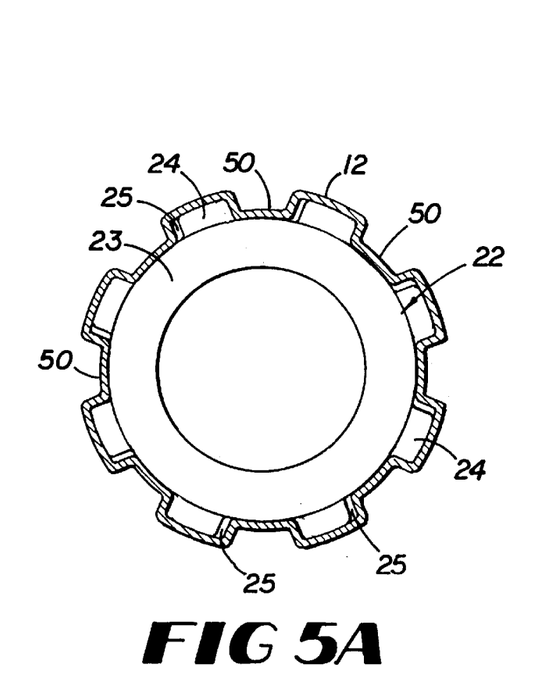
FIG. 5A is a radial cross sectional view taken along line 5—5 of FIG. 1 with the diaphragm and grid removed.
Figure 5B:
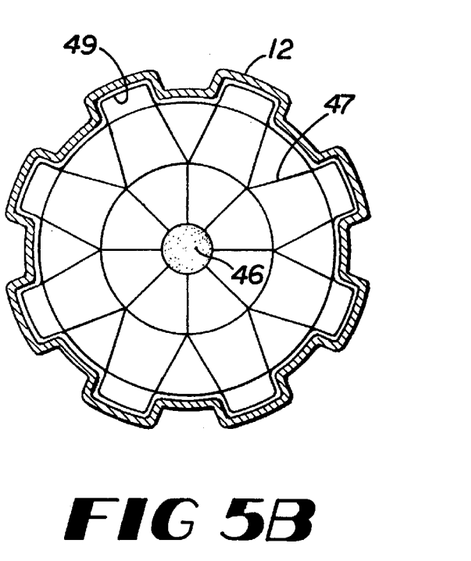
FIG. 5B is a radial cross sectional view taken along line 5—5 of FIG. 1 with the grid in place.
Figure 5C:
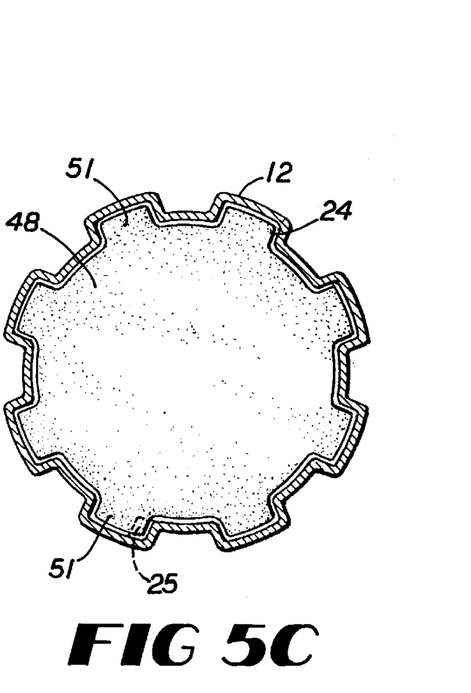
FIG. 5C is a radial cross sectional view taken along line 5—5 of FIG. 1 with the grid and diaphragm in place.

FIGS. 2 and 5 show a retainer 22 that fits into the bottom of the cell housing 12. The retainer 22 holds the cathode 18 and anode 16 against the cap 202. The retainer is formed of a non-conductive material defining a hollow central core 23 and a plurality of projections 24 positioned to extend into the plenums 20 below the cathode 18. The projections are carefully shaped to seal off the plenums 20 with the exception of isolating passageways 25 left between the projections 24 and the material of the housing 12, as shown in FIG. 5A. Mating openings 26 in the bottom of the housing allow air to-enter each of the isolating passageways 25.

Within the hollow core 23 of the retainer 22, an air moving device 37 is mounted. The air moving device may be one of several types, for example a blower or a diaphragm air pump. In the embodiment of FIGS. 1–5, the air moving device 37 includes a printed circuit board (PCB) 42 on which is mounted a control circuit including a programmed processor and memory. The control circuit may, for example, contain an electrical load sensor, and operate the air moving device intermittently based on the demand of the load applied to the cell. Such operation is described in co-pending application Ser. No. 08/936,206, filed Sep. 24, 1997.

The air moving device also includes an electromagnetic oscillator made up of a coil 44 affixed to the upper side of the PCB 42, and a magnet 46 shaped to be received within a central opening in the coil 44. The magnet 46 is attached to a grid 47, to which is attached a diaphragm 48, which may be made of various flexible materials including a thermoplastic elastomer (TPE) such as Santoprene® thermoplastic rubber available from Advanced Elastomer Systems. The grid 47 and the diaphragm 48 each have a circular center portion and defines tabs 49 and 51, respectively, extending radially into the plenums 20 of the housing 12 to fill the cross section of the housing 12. The periphery of the diaphragm 48, that is at least the tabs 49, is not attached to the grid 51. The diaphragm 48 thus is positioned between the isolating passageways 25 and the cathode plenums 20, and reciprocates with the magnet 46 when appropriate varying electrical current is supplied to the coil 44. When the magnet moves down, as viewed in FIG. 2, the diaphragm periphery separates from the plate 51 and allows air to pass from through the passageways 25, through the openings of the grid 47, around the diaphragm 48, and into a space created above the diaphragm. When the magnet moves up, the grid 51 carries the entire diaphragm up, compressing the air above the diaphragm and forcing it into the plenums 20. Thus, the diaphragm operates to pump air upward into the cathode plenums 20. The diaphragm 48 also could be driven by a piezoelectric oscillator or a microrelay.

In operation of the embodiment of FIGS. 1–5, in response to a load being applied across the terminals 14 and 17, the control circuit on the PCB 42 supplies a varying current, powered by the cell itself, to the coil 44. The coil in turn causes the magnet 46 and attached diaphragm 48 to reciprocate, pumping air from outside the cell through the openings 26, upwardly through the isolating passageways 25, and through the cathode plenums 20, where the fresh air provides oxygen to facilitate the electrochemical reaction described above. The air then exits the cell through the isolating passageways 206. When the air moving device 37 is not operating, the isolating passageways 25 and 206 protect the cell components from flooding or drying out by restricting air flow into and out of the cell.

Alternatively, the isolating passageways 206 may be eliminated when the plenums 20 are divided into two groups by the foil strips 52 as described above. Ducts (not shown) may be installed to guide the air pumped by the diaphragm solely to the plenums 20 of one group, and a further duct (not shown) may be provided at the top of the cathode 18 connecting the two groups of plenums. According to this alternative arrangement, the air flows up the first group of plenums 20, across to the second group of plenums 20, down through the second group of plenums to the passageways 25 associated with the second group of plenums, and out of the cell.

While power is being drawn from the cell 10, the circuit connecting the anode 16 and the cathode 18 extends from the anode spike 17, through the applied load, the cathode terminal 14, the conductive housing 12, and the cathode material 18 at the indentations 50. A nonconductive film (not shown) may be used to cover the cylindrical wall portion of the housing 12.

Figure 13:
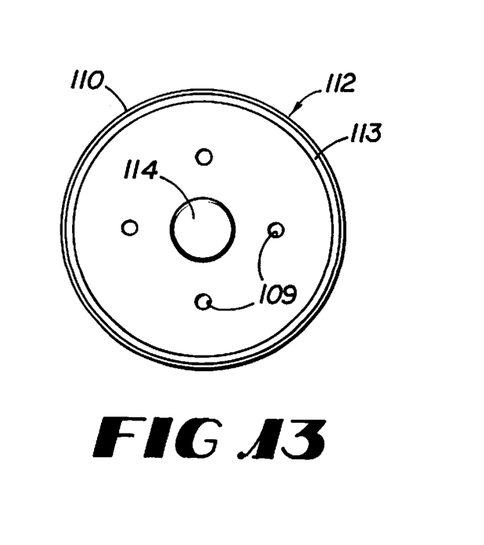
FIG. 13 is a bottom plan view of the cell housing shown in FIG. 6.

A second embodiment of the present invention in a cell 100 is shown in FIGS. 6–14. Those components bearing the same reference numerals have the same structure and function as described above in connection with the earlier embodiment. The cell 100 is built within a cylindrical case or housing 112, which has a generally smooth cylindrical wall 113. At the bottom of the housing 112, a projection 114 is formed to serve as a cathode terminal, and a plurality of air openings 109 pass through the bottom of the housing to allow outside air to enter the cell 100. A nonconductive layer 110, such as a plastic film, is attached to the cylindrical wall 113, as shown in FIG. 13.

Referring to FIGS. 7–10, a hollow cathode 118 fits into the housing 112 and contacts the inner surface of the housing. In contrast to the smooth outer surface of the cathode 18 described above, the cathode 118 is formed or extruded with peripheral, axial grooves 120, defined between elongate ridges 150. The ridges 150 contact the conductive housing 112 for cathode current collection, and thus cathode plenums are formed by the grooves 120 bounded by the housing 112. At the lower end of the cathode 118 is an area without ridges 150, defining a cathode extension 151. The preferred composition of the cathode 118 is as described above.

Figure 14:
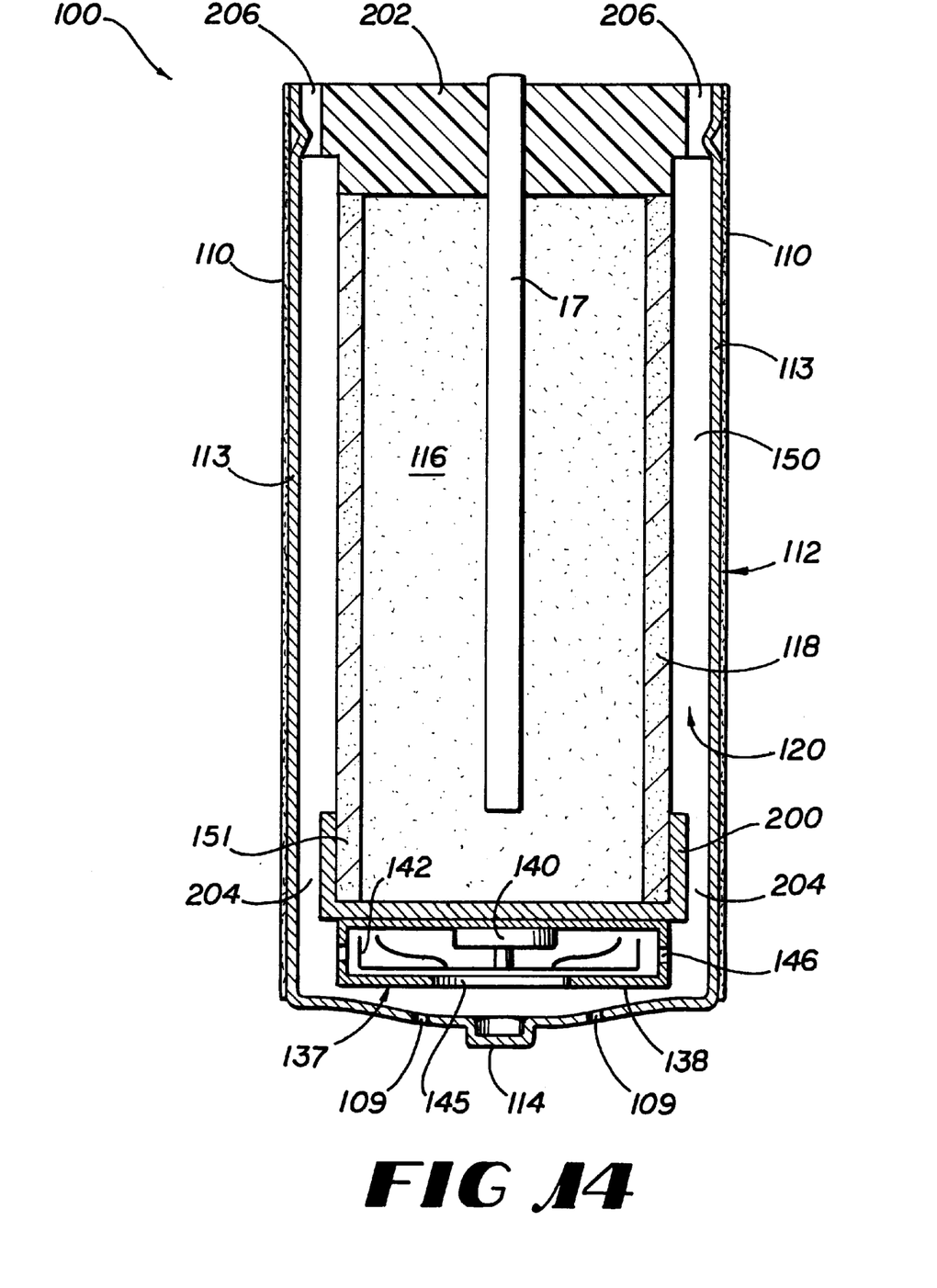
FIG. 14 is an axial cross sectional view of the cell of FIG. 6.

The cathode 118 is glued into a cup-shaped retainer 200 as shown in FIG. 14. The retainer 200, shown in detail in FIGS. 9–11, defines an upper recess 211 for receiving the cathode extension 151. A plurality of isolating passageways 204 are formed in the outer circumference of the retainer 200, separating ridges 152. The passageways 204 align with the axial grooves 120. A lower recess 214 is also formed in the retainer 200 for receiving an air mover assembly 137 described below. The lower recess communicates with a lower end of each of the passageways 204.

As was the case with the first embodiment described above, anode material 16 fills the hollow portion of the cathode 118. A cap 202 carrying a current collector spike 17 and defining isolating passageways 206 is installed at the top of the housing 112 in the manner described above. The anode material 16 is retained between the cup retainer 200 and the cap 202.

Figure 6:
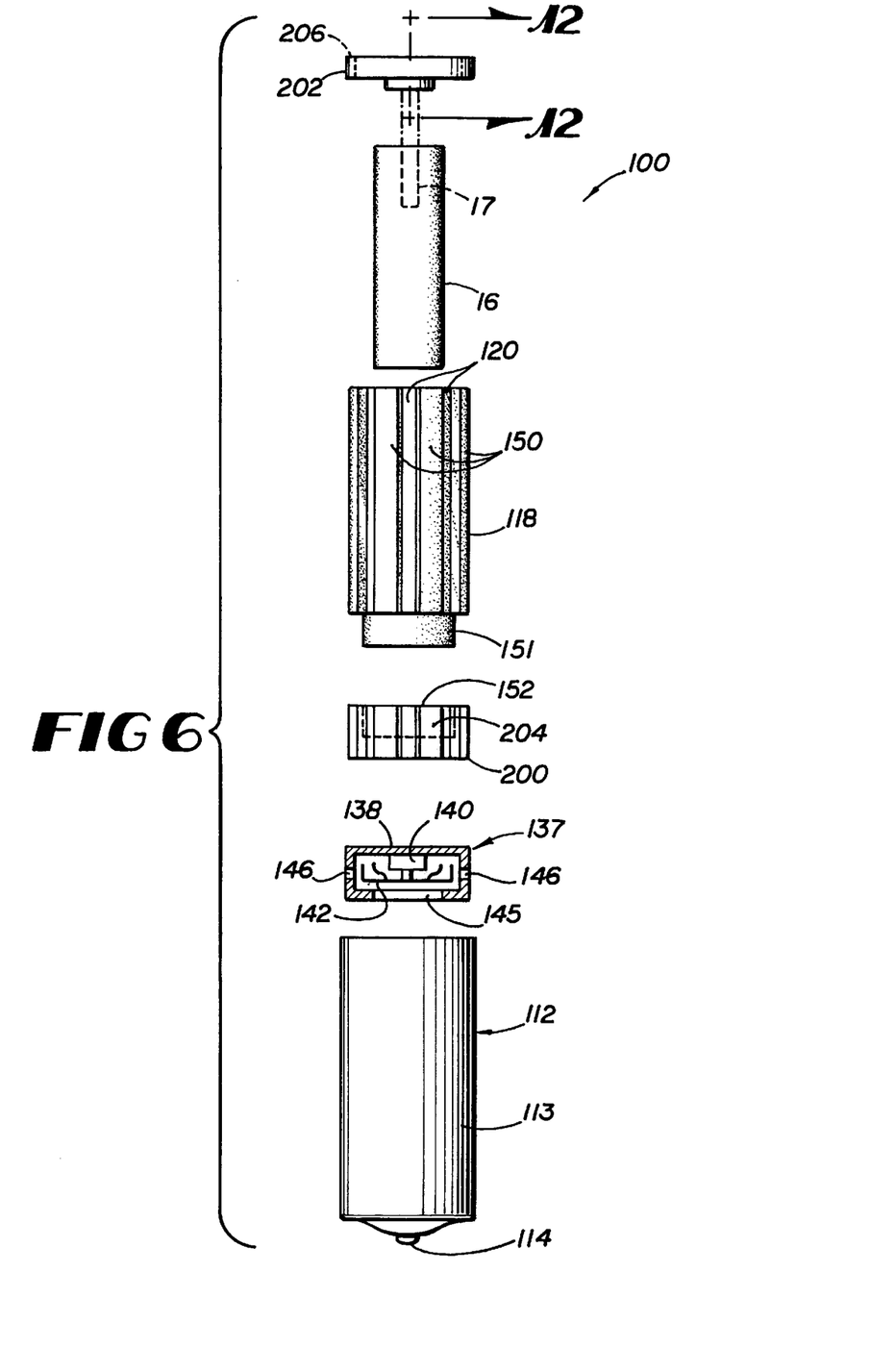
FIG. 6 is a diagrammatic exploded view of an alternative embodiment of a metal-air cell according to the present invention.
Figure 7:
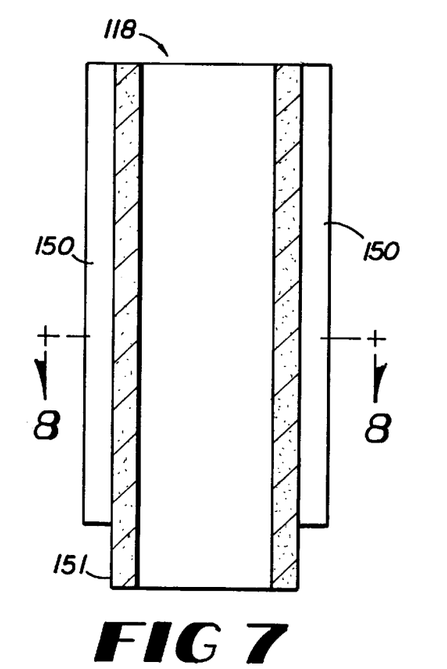
FIG. 7 is an axial cross sectional view of the air cathode of the cell of FIG. 6, taken along line 7—7 of FIG. 8.
Figure 8:
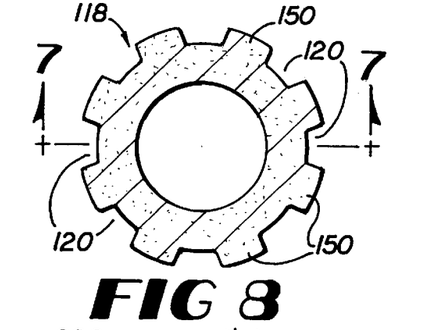
FIG. 8 is a radial cross sectional view of the air cathode taken along line 8—8 of FIG. 7.
Figure 9:
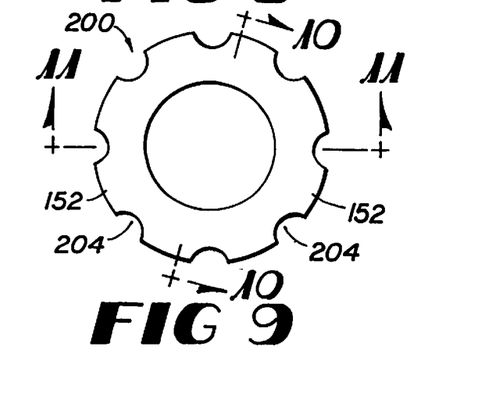
FIG. 9 is a top view of a bottom sealing cup of the cell of FIG. 6.
Figure 10:
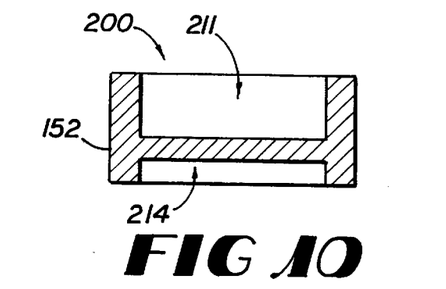
FIG. 10 is an axial cross sectional view taken along line 10—10 of FIG. 9.
Figure 11:
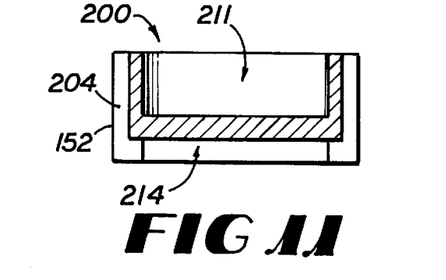
FIG. 11 is an axial cross sectional view taken along line 11—11 of FIG. 9.
Figure 12:
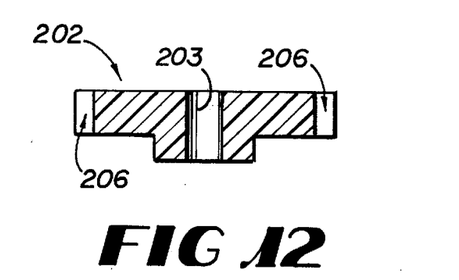
FIG. 12 is an axial cross sectional view of the cell cap taken along line 12—12 of FIG. 6.

The air mover assembly 137 shown in cross section in FIGS. 6 and 14 is a micromachine of the type based on the micromachining of non-metallic materials such silicon carbide, using lithography to define planar geometries which are then formed into structures by etching or vapor deposition. Multiple layers are employed to create complex three-dimensional devices. A description of rotary micromachine devices may be found in Epstein, A. H. et al., "Micro-Heat Engines, Gas Turbines, and Rocket Engines—The MIT Microengine Project," 28th AIAA Fluid Dynamics Conference/4th AIAA Shear Flow Control Conference (American Institute of Aeronautics and Astronautics, No. AIAA 97-1773, Jun. 29–Jul. 2, 1997). A description of a micromotor may be found in U.S. Pat. No. 4,943,750 to Howe et al. The diagrammatic representation of the air moving device in FIGS. 6 and 14 is greatly exaggerated.

Using these micromachining techniques, a blower housing 138 is fabricated enclosing a motor 140 and a squirrel cage blower 142 mounted on the motor drive shaft. The motor 140 may be of the type shown in U.S. Pat. No. 4,943,750, which is incorporated herein by reference in its entirety. The motor draws about 30 milliwatts from the cell to operate. The blower rotates on an air bearing at supersonic peripheral speeds. The diameter of the blower 142 may be, for example, 4 mm to 20 mm. The thickness of the housing 138 may be, for example, a few hundred microns. An inlet opening 145 communicates with the interior of the housing 112 in a lower portion adjacent to the air openings 109. One or more outlet openings 146 allow the blower to force air through the isolating passageways 204 into the cathode plenums formed by the grooves 120. Preferably, there is an outlet 146 aligned with each groove (i.e., plenum) 120. After traversing the plenums 120, the air may escape the cell through the isolating passageways 206.

The motor/blower 140, 142 operates at very high rotational speed, for example, 2 million rpm or more. At such high rpm, acoustic noise is at a low level at which persons using devices powered by the cell either would not be inconvenienced by the noise, or would not notice any noise.

When fabricating the blower using semiconductor manufacturing techniques, a control circuit is incorporated in the structure of the blower housing 138. This integrated circuit may be programmed to perform similar functions to those carried out by the circuit of the PCB 42 described above. In particular, the air moving device 137 may be operated in a pulsed manner to preserve energy. Thus, the air moving device 137 unifies the blower, motor, and control electronics in one device that occupies very little space, draws power at a low rate, and can be manufactured inexpensively using semiconductor mass production techniques.

As noted above, each cell having a standard "D" size can produce a power output of at least about 1.25 watt using a micromachine blower that draws 10% or less of the cell's available power while moving air at a rate of 75 cc per minute or higher. Each cell having a standard "AA" size can produce a power output of at least 0.5 watt using a micromachine fan that draws 10% or less of the cell's available power while moving air at a rate of 30 cc per minute or higher. It is possible to construct cells embodying the present invention having a standard "D" size that produce a power output of 2.5 watt or more using a micromachine blower that draws 10% or less of the cell's available power while moving air at a rate of 150 cc per minute or higher, and cells having a standard "AA" size that produce a power output of 1.0 watt or more using a micromachine fan that draws 10% or less of the cell's available power while moving air at a rate of 60 cc per minute or higher.

Referring in detail to the isolating passageways described above, these isolating passageways are preferably constructed and arranged to allow a sufficient amount of airflow therethrough while the air moving device is operating so that a sufficient output current, typically at least 50 ma, and preferably at least 130 ma can be obtained from the metal-air cells. In addition, the isolating passageways are preferably constructed to limit the airflow and diffusion therethrough such that the drain current that the metal-air cells are capable of providing to a load while the air moving device is not forcing airflow through the isolating passageways is smaller than the output current by a factor of about 50 or greater. In addition, the isolating passageways are preferably constructed to provide an "isolation ratio" of more than 50 to 1.

The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolating passageways of the type described above. In this example, an isolation ratio of more than 100 to 1 should be obtained.

More specifically, each of the isolating passageways preferably has a width that is generally perpendicular to the direction of flow therethrough, and a length that is generally parallel to the direction of flow therethrough. The length and the width are selected to substantially eliminate airflow and diffusion through the isolating passageways while the air moving device is not forcing airflow through the isolating passageways. The length is greater than the width, and more preferably the length is greater than about twice the width. The use of larger ratios between length and width are preferred. Depending upon the nature of the metal-air cells, the ratio can be more than 200 to 1. However, the preferred ratio of length to width is about 10 to 1.

The isolating passageways could form only a portion of the path air must take between the ambient environment and the oxygen electrodes. Each of the isolating passageways may be defined through the thickness of the battery housing or cell case, but preferably they are in the form of tubes as described above. In either case, the isolating passageways may be cylindrical, and for some applications each can have a length of about 0.3 to 2.5 inches or longer, with about 0.88 to 1.0 inches preferred, and an inside diameter of about 0.03 to 0.3 inches, with about 0.09 to 0.19 inches preferred. The total open area of each isolating passageway for such applications, measured perpendicular to the direction of flow therethrough, is therefore about 0.0007 to 0.5 square inches. In other applications, such as small cylindrical cells, the isolating passageways each can have a length of about 0.1 to 0.3 inches or longer, with about 0.1 to 0.2 inches preferred, and an inside diameter of about 0.01 to 0.05 inches, with about 0.015 inches preferred. The preferred dimensions for a particular application will be related to the geometry of the passageways and the cathode plenums, the particular air mover utilized, and the volume or air needed to operate the cells at a desired level.

The isolating passageways are not necessarily cylindrical, as any cross-sectional shape that provides the desired isolation is suitable. The isolating passageways need not be uniform along their length, so long as at least a portion of each isolating passageway is operative to provided the desired isolation. Further, the isolating passageways may be straight or curved along their length.

Other exemplary isolating passageways and systems are disclosed in U.S. Pat. No. 5,691,074 and U.S. application Ser. No. 08/556,613, and the entire disclosure of each of those documents is incorporated herein by reference.

Those skilled in the art will appreciate that other types of air moving devices could be used in the embodiments of the invention described above. For example, various types of rotary fans, piezoelectric air pumps, peristaltic air pumps, collapsible chamber air pumps, and other air movers could be used. Air moving devices are shown in the "Related Applications" listed above, which are incorporated herein be reference in their entireties.

What is claimed is:

1. A metal-air power supply, comprising:

a generally cylindrical housing having opposite ends and extending in an axial direction between the opposite ends;

an oxygen electrode that extends in the axial direction and is adjacent an interior surface of the housing;

a plurality of elongate plenums defined between the oxygen electrode and the interior surface of the housing;

a plurality of isolating passageways that at least partially define a communication path between the environment exterior to the housing and each of the plenums; and an air moving device operable when on for forcing air through the isolating passageways and into the plenums, wherein the isolating passageways are operable to restrict airflow through the isolating passageways while the isolating passageways are unsealed and the air moving device is not forcing air through the isolating passageways.

2. The metal-air power supply of claim 1, further comprising:

an anode surrounded by the oxygen electrode; and a cap covering a first end of the oxygen electrode to contain the anode within the oxygen electrode; and wherein the isolating passageways are defined between the cap and the interior surface of the housing.

3. The metal-air power supply of claim 2, wherein the cap is positioned between the air moving device and the oxygen electrode.

4. The metal-air power supply of claim 3, wherein the air moving device is within the housing.

5. The metal-air power supply of claim 1, wherein;

the plurality of isolating passageways is a plurality of first isolating passageways;

the metal-air power supply further comprises a plurality of second isolating passageways, each of which at least partially defines a communication path between the environment exterior to the housing and at least one of the plenums; and the plenums are communicatively positioned between the first isolating passageways and the second isolating passageways.

6. The metal-air power supply of claim 5, wherein said first and second isolating passageways collectively provide an isolation ratio of at least 100 to 1.

7. The metal-air power supply of claim 1, wherein said passageways are formed by elongate recesses in said oxygen electrode.

8. The metal-air power supply of claim 1, wherein said passageways are formed by elongate indentations in said housing.

9. The metal-air power supply of claim 1, wherein:

the air moving device is a micromachine blower; and the oxygen electrode is part of a metal-air cell that is capable of generating a power output of 0.5 watts or more when said micromachine blower is operating, and said blower drawing no more than 10% of the cell's available power while moving air at a rate of 30 cc per minute or higher.

10. The metal-air power supply of claim 9, wherein the cylindrical housing is "AA" size.

11. The metal-air power supply of claim 9, wherein said cell generates a power output of 1.25 watts or more when said micromachine blower is operating, and said blower draws no more than 10% of the cell's available power while moving air at a rate of about 75 cc per minute or higher.

12. The metal-air power supply of claim 11, wherein said cylindrical housing is "D" size and shape.

13. The metal-air power supply of claim 9, further comprising a control circuit integrated into a micromachined enclosure of said micromachine blower, said control circuit controlling the operation of said blower.

* * * * *

UNITED STATES PATENT AND TRADEMARK OFFICE
CERTIFICATE OF CORRECTION

PATENT NO.   : 6,274,261 B1
DATED        : August 14, 2001
INVENTOR(S)  : Tinker et al.

It is certified that error appears in the above-identified patent and that said Letters Patent is hereby corrected as shown below:

Title page,
Item [56], References Cited, U.S. PATENT DOCUMENTS, insert the following:
-- 5,665,481    9/1997  Shuster et al.
   5,837,394   11/1998  Schumm, Jr. --.

FOREIGN PATENT DOCUMENTS, insert the following:
-- 1 317 214          5/1973  (GB)
PCT/US99/29721        4/2000  (WO)
   2 040 346          2/1972  (DE) --.

Column 7,
Line 37, after "groove" insert -- 120 --; after "plenum)" cancel -- 120 --;
Line 38, after "plenums" insert -- formed by the grooves --.

Signed and Sealed this

Thirteenth Day of August, 2002

Attest:

JAMES E. ROGAN
Attesting Officer        Director of the United States Patent and Trademark Office